United States Patent [19]
Blochlinger

[11] 3,777,670
[45] Dec. 11, 1973

[54] SINGLE-DIRECTIONAL TRACK-GUIDED VEHICLE

[75] Inventor: Ernst Blochlinger, Neuhausen au Rheinfall, Switzerland

[73] Assignee: Schweizerische Industrie-Gesellschaft, Neuhausen a. R., Switzerland

[22] Filed: Sept. 17, 1971

[21] Appl. No.: 181,506

[30] Foreign Application Priority Data
Sept. 24, 1970 Austria.............................. 8631/70

[52] U.S. Cl................................. 104/246, 104/171
[51] Int. Cl............................................. B61b 13/00
[58] Field of Search...................... 104/244.1, 171; 105/144, 147; 280/63; 180/29, 79

[56] References Cited
UNITED STATES PATENTS

| 2,022,186 | 11/1935 | Butler | 104/171 |
| 1,170,332 | 2/1916 | Reno | 104/171 |
| 1,186,465 | 6/1916 | Bates | 104/171 |
| 3,630,153 | 12/1971 | Guimarin | 104/247 |
| 3,363,584 | 1/1968 | Brush et al. | 104/247 |
| 3,410,223 | 11/1968 | Miller | 104/247 |
| 521,460 | 6/1894 | Elliott | 280/63 |
| 1,348,464 | 8/1920 | Wheatley | 180/29 |
| 1,497,529 | 6/1924 | Moog | 180/29 |
| 2,365,884 | 12/1944 | Kucera | 280/63 |

*Primary Examiner*—Drayton E. Hoffman
*Attorney*—E. J. Berry et al.

[57] ABSTRACT

A road supported, track guided vehicle: The vehicle has a body with a center of gravity and has a road wheel assembly near the center of gravity, which carries the load of the vehicle body. A rail guided rail wheel assembly is connected through a rigid arm by an articulated connection to the vehicle body. The arm extends forwardly of the body and serves to vertically position and to guide the vehicle. Electric power may be drawn through the wheel assembly.

10 Claims, 4 Drawing Figures

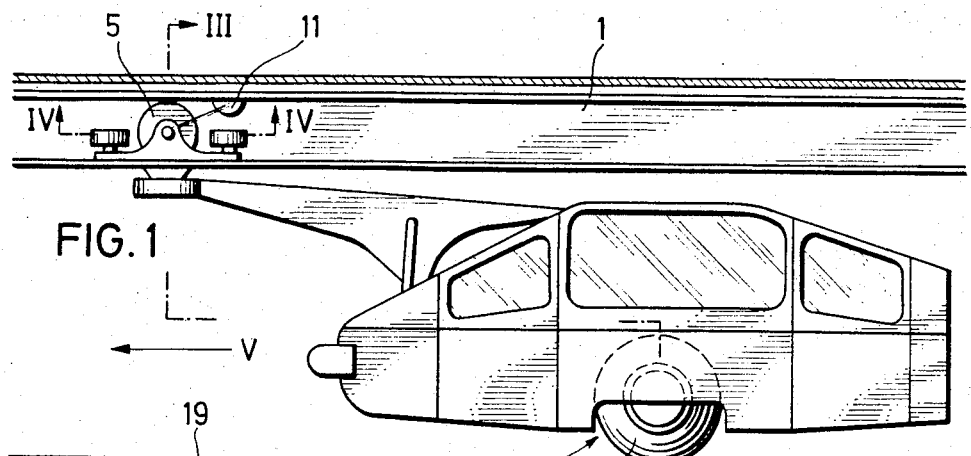
FIG. 1
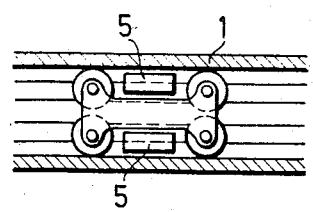
FIG. 2
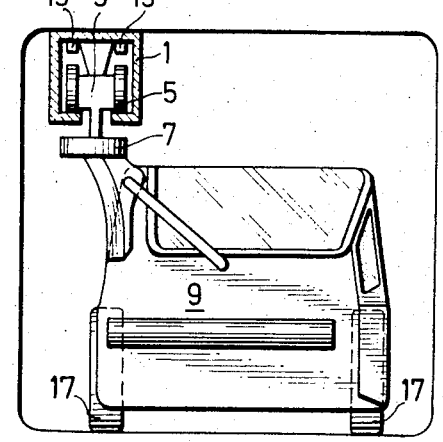
FIG. 3
FIG. 4

SINGLE-DIRECTIONAL TRACK-GUIDED VEHICLE

The present invention concerns a single-directional track-guided vehicle having a drive of its own and a braking system of its own and comprising a road wheel assembly and a rail wheel assembly.

Vehicles concurrently equipped with rail and road wheels fall into two groups by function: The first group, not under consideration here, comprises those which can alternately travel on the road or on rails. The second group comprises those vehicles which travel on a combined road and rail system. In this case, the rail wheels ensure guidance, while the road wheels serve to support the main load and transmit the driving and braking functions, for instance. In the known vehicles of the latter type, the rail wheel assembly, acting by linkages, controls the steering of the road wheels, or then bogies equipped with road wheels are positively guided in their course.

In either case, guidance is indirectly effected by the rail wheel assembly acting by road wheels which are steerable singly or groupwise. This involves extra constructional effort for the steering linkages or the bogies. Also, especially in the bogie version, skew-running of the wheels on the ground in bends is inevitable, which greatly increases wear power loss.

The object of the present invention is to take advantage of the interaction of rail wheels and road wheels while avoiding the aforesaid drawbacks.

The track-guided vehicle claimed hereunder is characterized in that the two wheel assemblies form parts of the vehicle, and that the road wheel assembly has a fixed travelling direction with respect to the vehicle body and is located abaft the rail wheel assembly and near the centre of gravity of the vehicle body, in such a manner that the main load is borne by the road wheel assembly.

An embodiment of the present invention is now to be described by way of example with reference to the accompanying drawing, in which:

FIG. 1 shows a side view of a track-guided vehicle with the travelling direction V;

FIG. 2 shows a top view of the vehicle according to FIG. 1;

FIG. 3 shows a cross-section through the vehicle in a tunnel tube along line III—III in FIG. 1;

FIG. 4 shows a section through the rail wheel assembly along line IV—IV in FIG. 1.

Travelling along a rail system 1 fixed in a tunnel is a rail wheel assembly 3 of a vehicle designed to travel in one direction only. The rail wheel assembly 3 is guided laterally and vertically by wheels 5 and is connected to the vehicle body 9 by a movable joint 7. Fitted to the rail wheel assembly 3 are current collectors 11 which are in contact with current-carrying bars 13 fixed to the rail system 1.

In the embodiment shown, the road wheel assembly 15 bears the main load and transmits the drive by the adhesion of tyred wheels 17 to a roadway 19. An electric motor 21, acting by reduction and differential gearing 23, drives the road wheels 17 and thus propels the vehicle in the travelling direction marked V. The wheels 17 are not steerable with respect to the vehicle body 9. The vehicle is therefore trailed.

The leading rail wheel assembly 3 trails the vehicle and, with it, the road wheels 17 of the road wheel assembly 15 along their course in the manner of a towpole, without requiring any lateral force or any additional steering gear.

In the embodiment shown, the rail wheel assembly 3 and the rail system 1 are arranged above the vehicle; they may be arranged over the centre line of the vehicle or at the side thereof.

Instead, however, the rail wheel assembly and the rail system may be arranged below the vehicle, in a slot in the roadway.

Both arrangements have their specific advantages. The overhead arrangement has the advantages that the roadway need not be slotted, that access is easier for construction and maintenance, and that the running surfaces, the railswitches and the current bars are less subject to interference by foreign matter, dust, water, etc. The advantage of the undersurface arrangement is that the road is free of any overhead components such as rails, supports, girders, etc.

For driving and braking, it is possible to use an electro-magnetic system, such as a linear motor and an eddy-current rail brake, for instance. These elements are preferably installed in the rail wheel assembly.

As the rail system is arranged either above or below the other vehicle components, branch-offs and junctions can be effected by railswitches and/or track preselection devices.

I claim:

1. A track guided vehicle, comprising:
  a vehicle body with a front and a rear end and a center of gravity therebetween;
  a road wheel assembly, for traveling on a road surface, attached to said vehicle body near the center of gravity thereof; and
  a rail wheel assembly also attached to said vehicle body by means which holds said rail wheel assembly away from said center of gravity whereby said rail wheel assembly guides said body and the main load of said body is borne by said road wheel assembly;
  said means for attaching said rail wheel assembly to said body comprising a rigid supporting arm connected to said body and extending toward an end of said body, said arm having sufficient rigidity to prevent tipping of said body around said center of gravity and to support said body vertically.

2. The vehicle of claim 1, wherein said rail wheel assembly is articulatedly connected to said body through said supporting arm.

3. The vehicle of claim 2, wherein said arm supports said rail assembly in front of said center of gravity.

4. The vehicle of claim 2, wherein said road wheel assembly is uniaxial.

5. The vehicle of claim 4, further comprising motor means connected with said road wheel assembly for driving said road wheel assembly.

6. In combination, the vehicle of claim 1 and a rail wheel assembly guiding rail system; said rail wheel assembly being guided in said guide rail system and being blocked against vertical shifting by said guide rail system.

7. The combination of claim 6, wherein said rail system is overhead and said rail wheel assembly is above said body.

8. The combination of claim 7, further comprising electrically operable motor means connected with said road wheel assembly for driving said road wheel assembly; current collectors in said rail wheel assembly being connected to said motor means for driving said motor means through electricity gathered by said current collectors.

9. The combination of claim 8, wherein said rail system is electrified and said rail wheel assembly current collectors are in contact with said electrified rail system.

10. A track guided vehicle comprising:
   a vehicle body having a front and rear end and a center of gravity therebetween;
   a road wheel assembly, for traveling on a road surface, attached to said vehicle body near the center of gravity thereof; and
   a rail wheel assembly carried by said vehicle body, said rail wheel assembly comprising an arm formed integrally with said vehicle body for supporting said rail wheel assembly away from the center of gravity of said vehicle body whereby said rail wheel assembly guides said vehicle and the main load of said body is borne by the road wheel assembly;
   said arm extending from said body toward one end thereof and having sufficient rigidity to support said vehicle body vertically and prevent the tipping of said body around the center of gravity.

* * * * *